United States Patent
Zambarda

(10) Patent No.: US 11,325,275 B2
(45) Date of Patent: May 10, 2022

(54) CUTTING SYSTEM, ADJUSTABLE SORTING APPARATUS AND METHOD THEREOF

(71) Applicant: ASTES4 SA, Balerna (CH)

(72) Inventor: Andrea Zambarda, Balerna (CH)

(73) Assignee: ASTES4 SA, Balerna (CH)

( * ) Notice: Subject to any disclaimer, the term of this patent is extended or adjusted under 35 U.S.C. 154(b) by 14 days.

(21) Appl. No.: 16/918,274

(22) Filed: Jul. 1, 2020

(65) Prior Publication Data

US 2021/0001507 A1 Jan. 7, 2021

(30) Foreign Application Priority Data

Jul. 1, 2019 (IT) .................. 102019000010557

(51) Int. Cl.
*B26D 7/32* (2006.01)
*B26D 1/06* (2006.01)

(52) U.S. Cl.
CPC .............. *B26D 7/32* (2013.01); *B26D 1/065* (2013.01); *Y10T 83/141* (2015.04); *Y10T 83/148* (2015.04); *Y10T 83/2185* (2015.04)

(58) Field of Classification Search
CPC .............. Y10T 83/467; Y10T 83/0448; Y10T 83/0453; Y10T 83/141; Y10T 83/145; Y10T 83/148; Y10T 83/152; Y10T 83/155; Y10T 83/162; Y10T 83/173; Y10T 83/175; Y10T 83/178; Y10T 83/2066; Y10T 83/207; Y10T 83/2092; Y10T 83/2185; B26D 7/32; B26D 7/18; B26D 7/1845; B26D 7/1854; B26D 7/1863; B26D 1/065; B26D 2007/322
See application file for complete search history.

(56) References Cited

U.S. PATENT DOCUMENTS

| | | | | |
|---|---|---|---|---|
| 4,331,050 A | * | 5/1982 | Gergek | G01D 5/3473 83/468 |
| 8,858,411 B2 | | 10/2014 | Mossi | |
| 2002/0069736 A1 | * | 6/2002 | Yasoda | B26D 7/22 83/62.1 |
| 2006/0153668 A1 | * | 7/2006 | Weick | B23K 37/0235 414/776 |
| 2017/0259376 A1 | * | 9/2017 | Beransky | B23K 26/0838 |
| 2020/0023481 A1 | * | 1/2020 | Imboden | B25J 9/026 |

FOREIGN PATENT DOCUMENTS

WO 2008/139409 A2 11/2008

* cited by examiner

*Primary Examiner* — Phong H Nguyen
(74) *Attorney, Agent, or Firm* — Nixon & Vanderhye

(57) ABSTRACT

A method and a cutting system for sheets includes a cutting center, a sorting apparatus with handlers for gripping pieces cut by the cutting center, and a transfer board, movable between the handler area and the inside of the cutting center, supporting the sheets. The cutting center includes a cutting head movably mounted above the transfer board with a distance detection sensor, detecting distance data with respect to a sheet on the transfer board. The cutting center and sorting apparatus have respective first and second control logics. A data interface unit lies between the first and second control logic, by which distance data from the distance detection sensor, are transferred. The second control logic has a processor defining, periodically during operation cycles, an altitude map based on the distance data detected in a number of positions, and controlling a gripping step of the handlers based on the altitude map.

8 Claims, 3 Drawing Sheets

CUTTING SYSTEM, ADJUSTABLE SORTING APPARATUS AND METHOD THEREOF

FIELD OF THE INVENTION

The present invention relates to the field of metal sheet handling in laser cutting plants. In particular, the invention relates to a sorting apparatus to draw pieces of metal sheets from a transfer board into a laser cutting machine and operation method thereof.

BACKGROUND

In the field of metal sheet processing, in particular in automatic cutting and sorting stations, the need exists to optimise processing times and use of the equipment, to the benefit of automation but also of cost reduction.

As known, in metal sheet cutting and punching operations, large use is made of laser cutting centres. In these apparatuses, a controlled head emits a high-power laser beam, which is directed perpendicularly to the metal sheet and moved according to paths defined by the control logic of the machine, so as to cause continuous punches and cuts in the metal sheet.

Since the cutting centre is fully encircled by a protective casing, the introduction of the metal sheet below the cutting head is typically achieved by means of a moving transfer board, which is caused to translate alternately from a position outside the machine, wherein the metal sheet can be laid on the board, towards a work position within the machine, wherein the metal sheet is cut by the laser head. Since the high-power laser beam runs through the metal sheet material and partly extends also beyond the metal sheet, the transfer board is arranged in a way to suffer as little as possible from the interference with the cutting laser beam. For such purpose, the board typically does not consist of a continuous plane, but consists of a plurality of parallel bars mutually spaced apart by a few centimetres. In particular, the bars are in the shape of thin elongated plates, arranged with the greatest surface parallel to the laser beam, with cusp-shaped edges: the array of all the cusps of the bars forms a grid, which defines a common plane whereon the metal sheet to be cut rests.

The comprehensive metal sheet processing line, in order to achieve satisfactory automation, provides also other metal sheet handling equipment (also called handlers or sorting machines) next to the metal sheet cutting centre, capable of drawing the virgin metal sheets from respective warehouses, transferring them onto the transfer board into the cutting centre and then retrieving and picking up the cut pieces and the scrap to deliver them to the proper collection stations. A particularly effective and advantageous sorting machine is the one described, for example, in WO2008/139409 in the name of the same Applicant.

As effective as handlers may be, during the drawing step from the grid of the transfer board, problems can arise. In particular, to cause the drawing of the cut pieces and of the scrap to occur without mistakes, it is necessary for the gripping members (either pneumatic void suction cups or electromagnets) of the handlers to drop to a short distance or in contact of the pieces to be drawn.

Although the working height of the sorting machine and particularly of the transfer board is known, the lowering/dropping height of the gripping members is adjustable, because at least the thickness of the different metal sheets which can be processed in the cutting centre must be taken into account. Since the metal sheet thickness data can be known at any processing cycle, it is possible to obtain this adjustment rather easily by supplying the thickness data to the control logic of the sorting machine.

However, there is another parameter which affects the actual height of the pieces to be drawn, which is not known beforehand: the height of the grid of the transfer board. As a matter of fact, the resting grid is of a variable height, because it tends to wear and tear following the repeated interactions with the laser beam inside the cutting centre. Moreover, grid wear is fully irregular along its extension, being dependent from how frequently the laser cutting head passes and rests on a part thereof.

FIG. 1 shows an exemplifying picture of a resting grid, after it has worked for a certain number of cycles within a cutting centre. As can be seen, the grid cusps are worn unevenly.

That implies that the correct gripping height of the handlers not only should be adjusted in time to take into account by how much on average the height of the resting grid decreases, but it should also be taken into account that such height varies from one area to the next on the gripping reference plane of the resting grid.

Today the solution to this problem can be dealt with in two possible ways. On the one hand, replacing the bars of the resting grid as soon as the wear level begins giving rise to problems with gripping the pieces. This solution is evidently burdensome in terms of costs and of equipment idle time, because it implies frequently replacing the material which makes up the transfer board. On the other hand, installing onboard each handler a height detector of the pieces to be drawn, so as to locally adjust the height of the gripping members in any position they take on the resting grid. Also, this solution is burdensome, especially if a plurality of gripping members is provided on the sorting machine.

Therefore, these hypothetical prior art solutions, although they are theoretically feasible, prove not to be fully satisfactory.

The need is therefore felt to provide an improved sorting apparatus, which is capable of adjusting the gripping height of the pieces in an automatic and adjustable way in the various gripping areas, which does not require costly additional height detectors or a frequent replacement of the resting grids of the transfer board.

SUMMARY OF THE INVENTION

The objects set forth above, according to the present invention, are achieved by means of a sorting apparatus and operation method thereof, having the features defined in the attached main claims. Other preferred features of the apparatus and of the method are defined in the dependent claims.

BRIEF DESCRIPTION OF THE DRAWINGS

Further features and advantages of the invention will in any case be more evident from the following detailed description of a preferred embodiment of the same, provided purely as a non-limiting example and illustrated in the attached drawings, wherein.

DETAILED DESCRIPTION OF THE PREFERRED EMBODIMENTS

Figure 1:
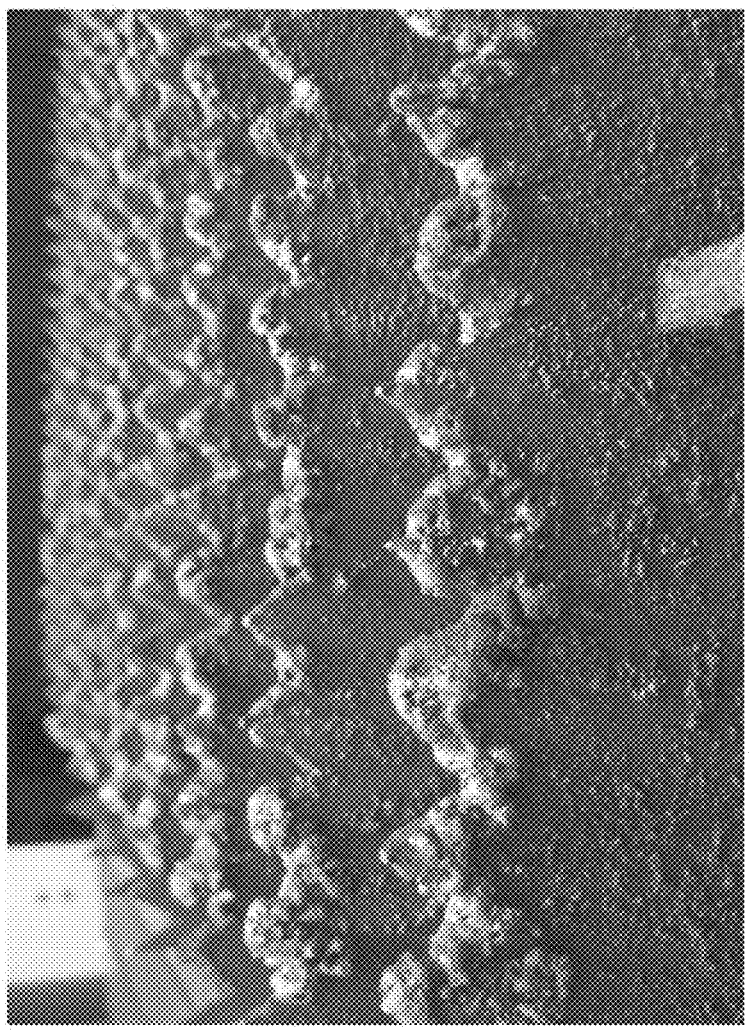
FIG. 1, as already mentioned, is a perspective view of a part of resting grid worn by operation within a laser cutting centre.
Figure 2:
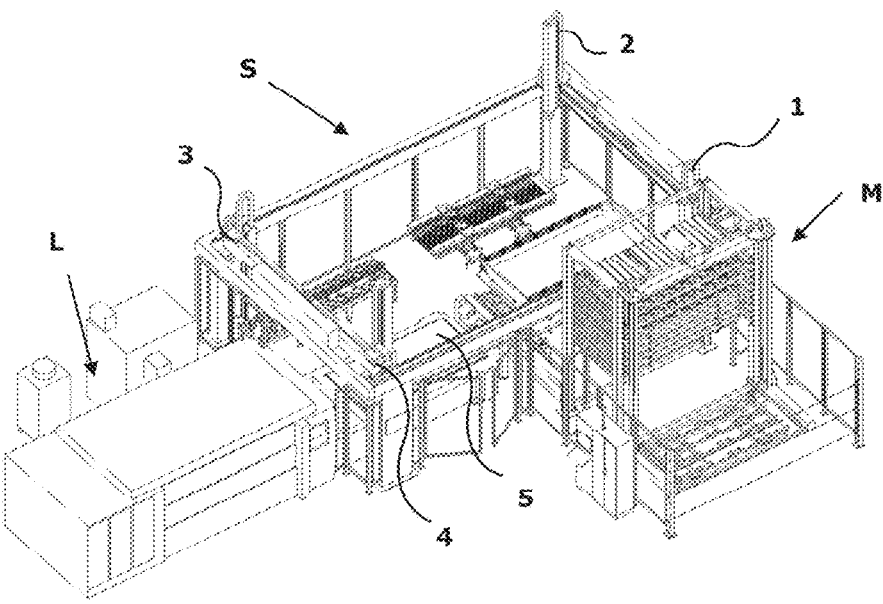
FIG. 2 is an exemplifying perspective view of a sorting machine docketed to a laser cutting centre, also provided with a metal sheet warehouse.

FIG. 2 shows an exemplifying system for the cutting and processing of metal sheets. Next to a laser cutting unit L a sorting machine S is arranged which is served by a metal sheet warehouse M.

Sorting machine S has one or more handlers, for example four independent handlers 1-4, configured to draw metal sheets Fe from warehouse M and transfer them—in the mode and times established by the control logic—to a transfer board 5, meant for the translation of the metal sheet inside and outside of cutting centre L.

For such purpose, transfer board 5 is arranged, in a manner known per se, with a frame 5a slidably mounted on rails, for example by means of wheels 5b (see FIG. 3), provided with a plurality of support bars 5c mutually spaced apart by few centimetres. Support bars 5c are for example in the shape of thin elongated plates, arranged with the greatest surface on a vertical plane parallel to a laser beam operating within the cutting unit L, with shaped edges so as to form a resting grid.

Handlers 1-4 are furthermore arranged to perform the drawing of the individual cut pieces and of the scrap, to unload them from transfer board 5 and place them in the proper collecting stations intended to that purpose.

It is to be noted that the control logic of the sorting machine is capable of performing a series of complex operations to drive handlers 1-4 and optimise drawing times and the full work cycle. For such purpose, the control logic of sorting machine S, not only is typically interfaced with the process software which defines the pieces to be cut which is run upstream (for example to optimise the nesting techniques of the pieces based on the movement capabilities of the handlers), but also with the control logic of cutting centre L, with which there is a data exchange at least to coordinate the operating times of cutting centre L with the typical times of drawing the virgin metal sheets and unloading the cut pieces. To this purpose, sorting machine is docketed to the cutting center L.

Figure 3:
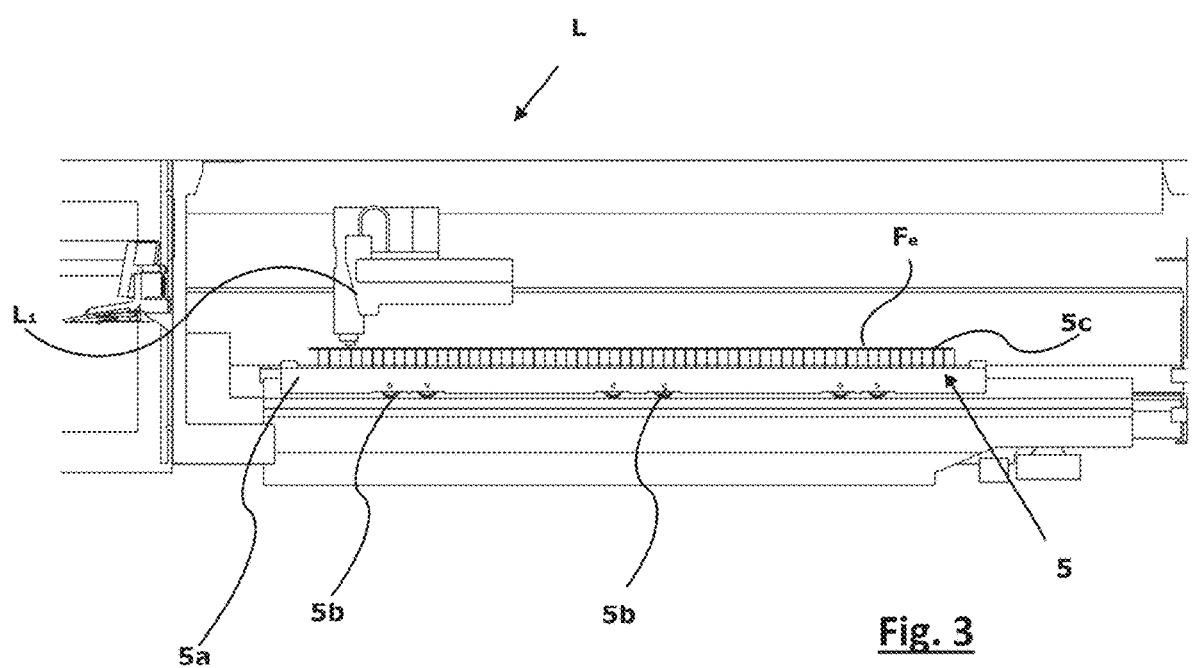
FIG. 3 is a partial, cross-section view of a laser cutting centre during a metal sheet cut.

FIG. 3 shows a metal sheet Fe resting on transfer board 5—which, in this step, lies within cutting centre L—while it is engraved by a laser head $L_1$ which emits a laser cutting beam while it slides at a short distance from the surface of metal sheet Fe.

Laser cutting beam $L_1$ moves on the Cartesian axis, with a guiding and control mechanism known per se, based on a preset control programme, following the contours of the pieces to be cut, preferably with an optimised sequence which reduces operating times.

Laser cutting technology provides that the laser light source is maintained at a preset distance from the material to be cut (which distance depends on various factors, linked to the thickness and type of material), to be able to obtain a repeatable and effective cut. Therefore, onboard the cutting head a distance sensor is normally provided, which detects the distance between a fixed reference of the cutting head and the surface of the metal sheet: the detected distance signal is used by the control logic of the cutting centre L to adapt, position by position, the height of the laser source, so as to always remain at the desired distance with respect to the metal sheet surface and by consequence, indirectly with respect to the transfer board.

According to an embodiment of the invention, the control logic of the sorting machine is interfaced with the control logic of the cutting centre, so as to transfer from one to the other at least the altitude data acquired by the distance sensor onboard the cutting head. Said altitude data include distance data from a reference height of the cutting head to the height of the metal sheet in a number of positions on the resting plane of the metal sheet, i.e. in a number of positions spread on the Cartesian plane of the transfer board. Other data which can be transferred from the control logic of the cutting centre to the control logic of the sorting machine are, as an example, the position of the metal sheet on the transfer board.

The altitude data acquired by the distance sensor associated with the cutting head, by a suitable interface, are hence transferred by the control logic of cutting centre L to the control logic of sorting machine S.

These altitude data are processed by the control logic of the sorting machine for defining a map of the metal sheet surface altitude—and indirectly of the underlying resting grid—with respect to a fixed reference system, as detected within the cutting centre.

The position-by-position altitude map of the metal sheet surface is a function of the wear of the below resting grid 5c.

The altitude map includes altitude data of the metal sheet in points (positions) of a Cartesian plane mutually distant by a preset distance, for example not greater than 10 mm.

When transfer board 5 comes out of cutting centre L and goes back into sorting machine S, the control logic of the sorting machine hence has an overall updated map of the altitude of the cut metal sheet, position by position. With such a map and the preset measure of the fixed height offset between the transfer board in the inner and outer locations, the control logic is capable of calculating the actual height of the cut metal sheet laying on the specifically worn transfer board. Accordingly, the handlers can be lowered to the correct level on the metal sheet, bringing the gripping members to the desired distance, short or in contact, depending on the type of gripping member, from the metal sheet surface and hence guaranteeing an efficient grip in any gripping position.

Thereby, the drawing of the pieces and of the scrap from transfer board 5 can occur accurately and without malfunctioning, regardless of how locally worn bar-shaped resting grid 5c is.

The system is controlled such that an original processing method of gripping the cut metal pieces is carried out. The gripping members can be lowered always at the desired level on the metal sheet of the pieces, regardless of the wear amount of the resting grid.

The method allows to accurately detect the actual height of the resting grid, through process of the altitude map, during a number of working cycles, so as to provide for removal of the worn bars of the grid only when their wear amount exceeds a preset threshold. In other words, the control method includes a changing step of substituting at least a portion of the transfer board when experiencing a wear, which changing step is performed when the altitude map is below a preset height threshold.

Figure 4A:
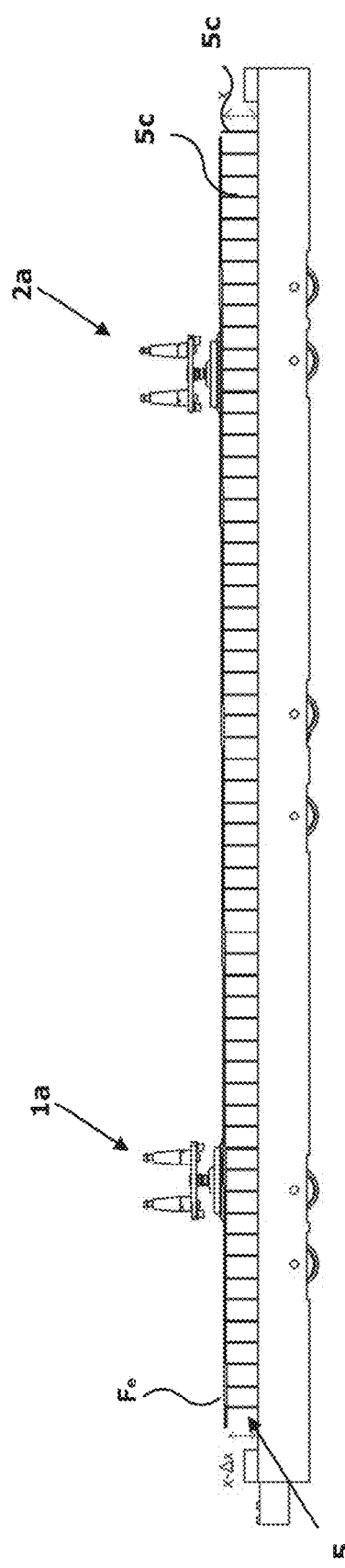
FIGS. 4A and 4B are partial front and lateral elevation views, respectively, of a partly-worn transfer board, with gripping handlers driven by the system according to the invention.

FIG. 4A shows a grid consisting of a plurality of bars 5c—seen frontally, so that only the low-thickness corner is glimpsed—worn in an uneven manner, in particular with bars on the left hand-side region in the picture having reduced height with respect to the ones on the right hand-side region. Please notice that two gripping heads 1a and 2a of handlers 1 and 2 are resting correctly onto metal sheet Fe despite the different altitude of the two regions, due to the system of the invention which has driven the two handlers 1 and 2 to lower/drop in a different manner onto the metal sheet Fe.

Figure 4B:
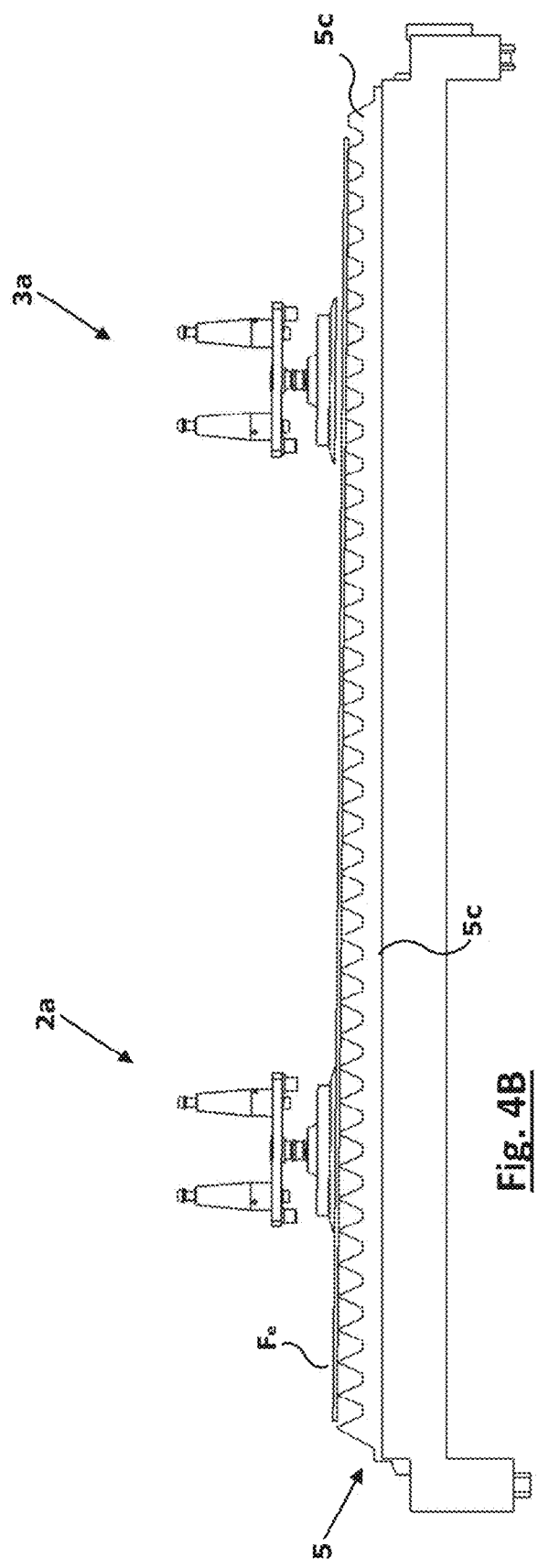

FIG. 4B shows instead laterally a bar 5c, the cusps of which are worn in a differentiated way, in particular the right-hand side in the picture is more heavily worn, with respect to the left-hand side. Please notice that two gripping heads 2a and 3a of handlers 2 and 3 are correctly resting onto metal sheet Fe despite the different altitude taken up by metal sheet Fe, due to the system of the invention, which can drive the two handlers 2 and 3 to drop in a differentiated manner onto the metal sheet based on the altitude map created with the data supplied by the cutting centre.

According to an alternative embodiment, the system provides that the control logic of the sorting machine and the control logic of the cutting centre are resident on the same device or unit, for example using the same hardware or with dedicated and separate hardware but resident on a same electronic board or control panel. In any case, as described above, the software routines of the control logics are suitably interfaced—from a merely logical point of view or even by means of suitable hardware elements—to make available the distance data, acquired through the distance sensor associated with the cutting head, with the control routine of the handlers, so as to repeatedly build a mapping of the altitude of the metal sheet along the useful life of the resting grid.

In that respect, it is understood that the first and the second control logic, of cutting centre L and of sorting equipment S, respectively, are not necessarily distinct and separate, but can coincide in the same hardware and/or software.

As it is clearly understood from the description reported above, the sorting apparatus and the relative control method according to the present invention allow to perfectly achieve the set objects.

As a matter of fact, interfacing the control logic of the sorting machine with the control logic of the cutting centre, hence without the need to provide and install additional altitude sensors, it is possible to obtain a mapping of the altitude of the metal sheet resting on the transfer board. Such mapping is used by the sorting machine to lower the handlers, point by point or area by area, based on the specific altitude at which the metal sheet is located, adapting to the local and unforeseeable wear of the resting grid. Thereby it is possible to avoid gripping errors of the cutting pieces and of the scrap, even without proceeding to a premature replacement of the resting grid; moreover, it is possible to have information on the progressive wear of the resting grid and hence to be able to determine when the optimal time is for the replacement thereof.

However, it is understood that the invention must not be considered limited to the particular arrangement illustrated above, which makes up only an exemplifying embodiment thereof, but that different variants are possible, all within the reach of a person skilled in the field, without necessarily departing from the scope of protection of the invention, which is only defined by the following claims.

For example, although reference has been made to a position-by-position altitude mapping, it is not ruled out that the handlers are adapted to the metal sheet altitude using a mapping which determines an altitude for adjacent areas. Thereby it is possible to reduce the amount of exchanged data, saving power and computing time, without overly affecting system effectiveness. For example, the altitude map useful for driving and controlling the handlers can be built for points/positions which have mutually different altitudes by at least a k factor, where k can be defined by the operator according to requirements.

Again, although in the description reference has always been made to a laser cutting centre (which employs, for example, $CO_2$ laser devices, fibre laser devices or the like), it is not ruled out that the apparatus and the method of the invention can be advantageously applied also to other types of cutting centres, for example with waterjet heads, provided they are equipped with altitude sensors installed in the proximity of the cutting head and interfaced with the control logic of the system.

Finally, the system has been described with reference to handling of metal sheet, but the material of the sheet is not relevant for the teaching of the invention: alternative materials can be glass, stone, plastic, composite and so on, provided that the cutting head is properly adapted to the material to be cut.

The invention claimed is:

1. A cutting system for sheets, comprising at least a cutting centre (L), a sorting apparatus (S) provided with handlers (1-4) for gripping pieces cut by said cutting centre and a transfer board (5), movable between an area where said handlers (1-4) operate and the inside of the cutting centre (L), apt to support said sheets,
    said cutting centre (L) comprising at least a cutting head (L1), which is mounted movable above said transfer board (5) and is provided with a distance detection sensor which detects distance data with respect to a sheet to be cut resting on said transfer board (5),
    said transfer board (5) comprising a resting grid (5c) which is partly worn by said cutting head (L1), and wherein
    said cutting centre (L) and said sorting apparatus (S) have respective first and second control logics, characterised in that
    data interface means are furthermore provided, between said first control logic of the cutting centre (L) and said second control logic of the sorting apparatus (S), by which said distance data, acquired by said distance detection sensor, are transferred and in that
    said second control logic has processing means
    for defining, periodically during operation cycles, an altitude map based on said distance data detected in a number of positions, and
    for controlling a gripping step of said handlers (1-4) based on said altitude map.

2. The cutting system as in 1, wherein said grid is made of thin parallel bars, provided with a multiple-cusp-shaped edge.

3. The cutting system as in 1, wherein said altitude map includes altitude data in a number of positions of a Cartesian plane.

4. The cutting system as in 3, wherein said number of positions are distant from one another no more than 10 mm.

5. The cutting system as in 1, wherein said processing means define a new altitude map at each work cycle of a new sheet.

6. A sorting apparatus for a system as in claim 1, comprising a control logic and a data interface with a cutting centre (L) and characterised in that
    said data interface is arranged for transferring distance data acquired by a distance detection sensor onboard a cutting head of the cutting centre (L), and in that
    said control logic has processing means for defining, periodically during working cycles, an altitude map based on said distance data detected in a number of positions, and for controlling a gripping step of said handlers (1-4) according to said altitude map.

7. A control method of a cutting system of sheets comprising at least a cutting centre (L), a sorting apparatus (S) provided with handlers (1-4) for gripping pieces cut by said cutting centre and an transfer board (5), movable between an area where said handlers (1-4) operate and the inside of the cutting centre (L), apt to support said sheets, comprising at least the steps of laying a sheet onto said transfer board (5) and inserting said transfer board (5) into said cutting centre (L), performing a cut of said sheet by moving a cutting head (L1) of said cutting centre above said board (5), acquiring distance data between a reference height of said cutting head (L1) and a sheet to be cut resting on said transfer board (5) by means of a distance detection sensor associated with said cutting head (L1), characterised in that it also comprises the steps of transferring said distance data, by means of interface means, to a control logic of said sorting apparatus (S) during a number of working cycles when the transfer board experiences a wear, processing, by means of said control logic, an altitude map based on said distance data detected in a number of positions, and controlling said handlers (1-4) based on said altitude map.

8. The control method of a cutting system as in claim 7, wherein a changing step of substituting at least a portion of said transfer board experiencing a wear is also provided, which changing step is performed when said altitude map is below a preset height threshold.

* * * * *